March 10, 1959 W. H. NEELY ET AL 2,876,826
FABRIC TRIM CONNECTING MEANS
Filed Dec. 7, 1956 3 Sheets-Sheet 2
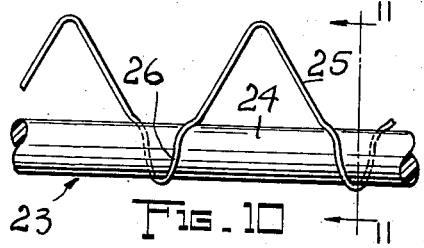
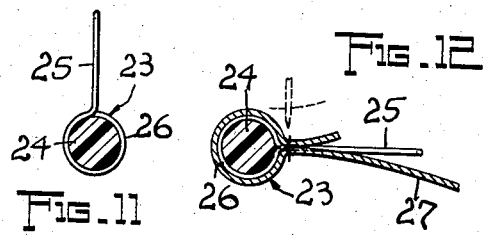
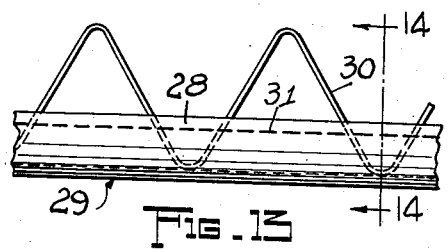
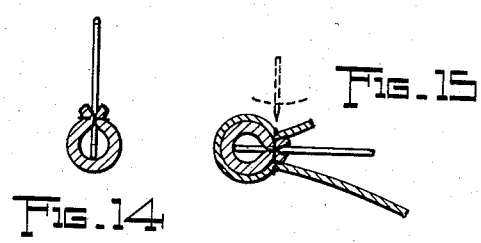
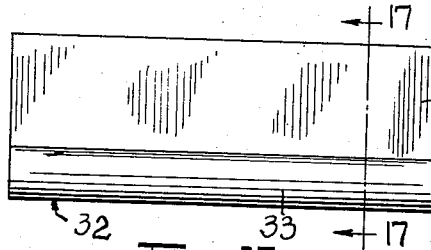
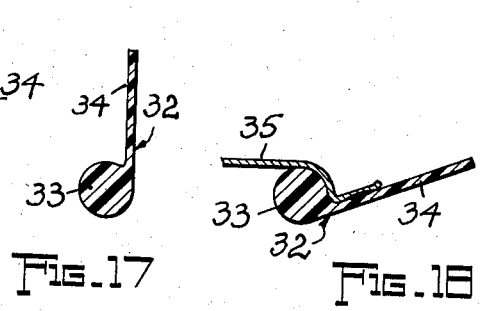
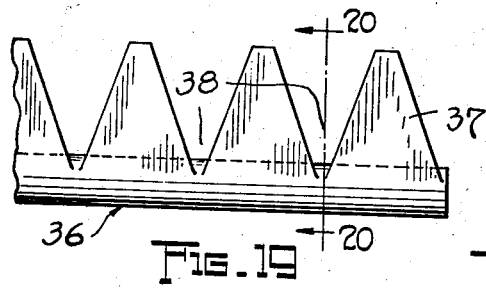
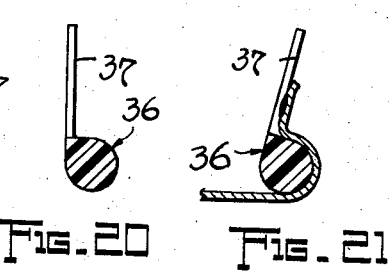
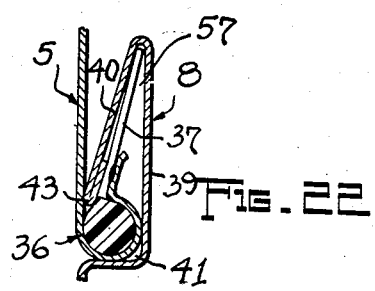
INVENTOR.
WILLIAM H. NEELY
BY JOHN OSWALD
ATT.

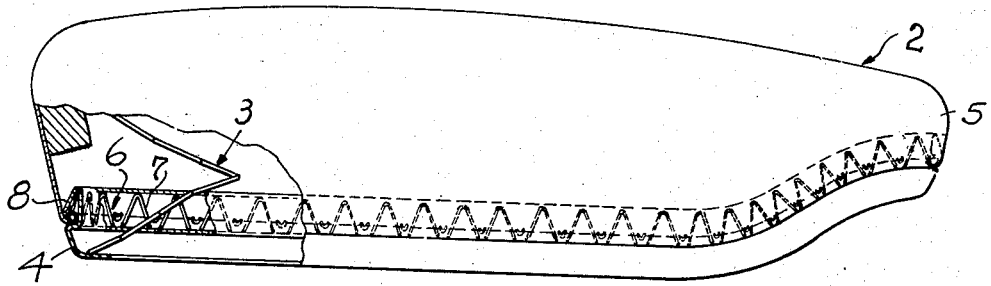
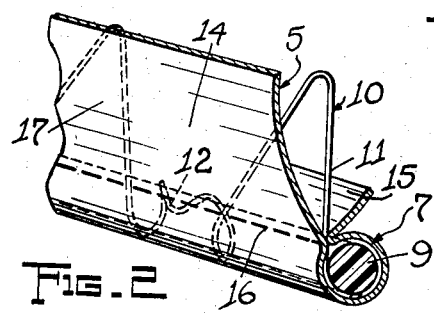 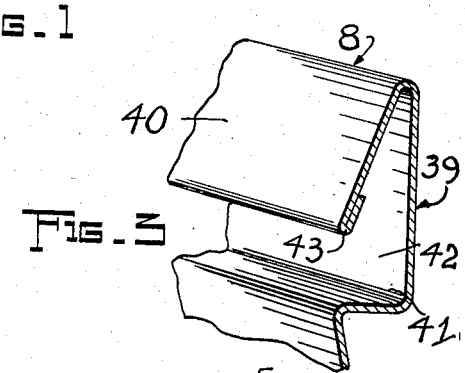
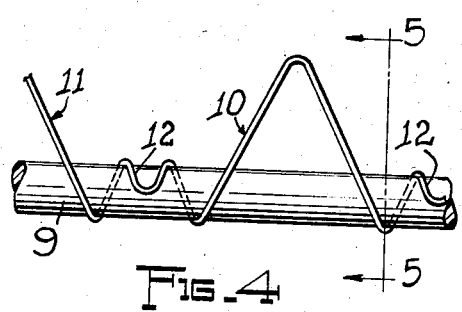 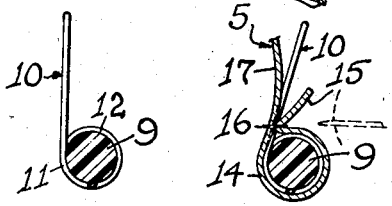
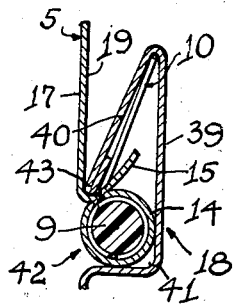 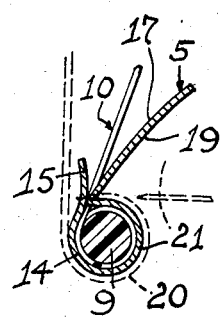 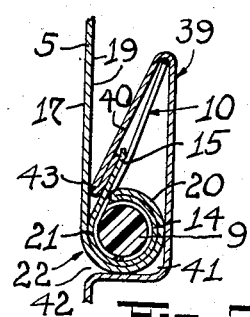

INVENTOR.
WILLIAM H. NEELY
JOHN OSWALD
BY
ATT.

United States Patent Office 2,876,826
Patented Mar. 10, 1959

2,876,826

FABRIC TRIM CONNECTING MEANS

William H. Neely, Cleveland, Ohio, and John Oswald, Birmingham, Mich., assignors to The Universal Wire Spring Company, Bedford, Ohio, a corporation of Ohio Application December 7, 1956, Serial No. 627,027

7 Claims. (Cl. 155—180)

This invention relates to means for attaching fabric trim, leather, plastic trim, and the like, to aircraft structures, automotive vehicles, automobile seats, furniture seats, buildings, etc.

The principal object of this invention is the provision of simple, practical and effective fabric trim connecting means for releasably connecting fabric trim and the like to structures, vehicles and seats of the general type referred to above, the connecting means embodying resilient male members of elongated, cylindrically shaped, longitudinally flanged bodies, and rigid female members of elongated, longitudinally slotted tubular bodies of multi-angular outline, such as triangular, rectangular, etc.

In these fabric trim connecting means, the male members according to the invention have the cylindrically shaped body portions of their longitudinally flanged bodies secured to edges of fabric trim to freely expose the flanges of the male members for cooperation with female members secured to or formed as integral portions of structures to which fabric trim is to be attached.

Another object of the invention therefore is the provision of fabric trim connecting means of the type referred to above in which the male members have attached to the body portions of their flanged bodies edge portions of fabric trim so as to freely expose the flanged portions of the male members for cooperation with the slotted female members of the fabric trim connecting means.

A further object of the invention is the provision of fabric trim connecting means of the type referred to above in which the multi-angularly shaped tubular female members include near one longitudinal edge thereof elongated slots dimensioned to closely fit the body portions of the male members with fabric trim attached thereto.

Still other objects of the invention lie in the provision of fabric trim connecting means of the type referred to above with resilient male members having fabric trim attached thereto, and rigid female members seating said male members and yieldingly retaining same by the resiliency of the elongated flanges thereof.

Still further objects of the invention lie in the provision of fabric trim connecting means of the type referred to above which include specifically constructed male members and female members specifically associated with each other for plain edge and roll edge design of a fabric trim connection.

Additional other objects and novel features of construction, combinations and relations of parts by which the objects in view have been attained will appear and are set forth in detail in the course of the following specification. The drawings, accompanying and forming part of the specification, illustrate certain practical embodiments of the invention, but it will be apparent as the specification proceeds that these structures may be modified and changed in various ways without departure from the true spirit and broad scope of the invention.

In the drawings:

Fig. 1 is a side view partly in section of an upholstered spring seat structure, the fabric trim cover of which is attached to the frame of the spring seat structure in accordance with the invention.

Fig. 2 is an enlarged fragmentary perspective view of the male member of the fabric trim connecting means shown in Fig. 1, the male member having fabric trim stitched thereto.

Fig. 3 is an enlarged fragmentary perspective view of the female member of the fabric trim connecting means shown in Fig. 1.

Fig. 4 is a side view of the male member shown in Fig. 2, the fabric trim being omitted.

Fig. 5 is a sectional view taken on line 5—5 of Fig. 4.

Fig. 6 is a sectional view similar to Fig. 5, with fabric trim attached thereto by stitching.

Fig. 7 is a sectional view of the fabric trim connecting means with a male member of the type shown in Fig. 6 providing a fabric trim connection with roll edge design.

Fig. 8 is a sectional view similar to Fig. 6, with the fabric trim secured to the male member for plain edge design fabric trim connection; and Fig. 9 is a sectional view through a plain edge design fabric trim connection with a male member of the type disclosed in Fig. 8.

Figs. 10 through 21 show modified forms of male members of fabric trim connecting means, thus Fig. 10 is a side view of a male member in which the resilient flange is formed by a zigzag wire encircling with its loops at one side the body of the male member and bent to extend radially therefrom.

Fig. 11 is a sectional view taken on line 11—11 of Fig. 10.

Fig. 12 is a sectional view similar to Fig. 11, with fabric trim stitched thereto.

Fig. 13 is a side view of a male member formed from a strip of material bent to a tubular structure and a zigzag-shaped wire extended with its loop into the tubular structure and secured thereto by stitching to extend the zigzag-shaped wire radially from the tubular structure.

Fig. 14 is a sectional view taken on line 14—14 of Fig. 13.

Fig. 15 is a sectional view similar to Fig. 14, with fabric trim material stitched thereto.

Fig. 16 is a side view of a male member of plastic or similar material.

Fig. 17 is a sectional view taken on line 17—17 of Fig. 16.

Fig. 18 is a sectional view similar to Fig. 17, with fabric trim material glued thereto.

Fig. 19 is a side view of a male member of plastic or similar material including in its elongated flange a plurality of notches to facilitate bending of the male member around corners.

Fig. 20 is a sectional view taken on line 20—20 of Fig. 19.

Fig. 21 is a sectional view similar to Fig. 20, with fabric trim glued thereto.

Fig. 22 is a sectional view of a fabric trim connection with a male member of the type shown in Fig. 21.

Fig. 23 is a sectional view of a fabric trim connection in which the male member with its flange is partly extended through the slot into the female member.

Fig. 24 is a sectional view of the fabric trim connection in which the male member with its deformed flange is fully extended into the female member and tends to yieldingly draw the body of the male member into the female member; and Fig. 25 is a sectional view of the fabric trim fully assembled.

Fig. 26 is a sectional view of a fabric trim connection embodying a female member of rectangular tubular form.

Fig. 27 is a sectional view of a fabric trim connection embodying a female member of triangular tubular form having its one side curved.

Figure 28:
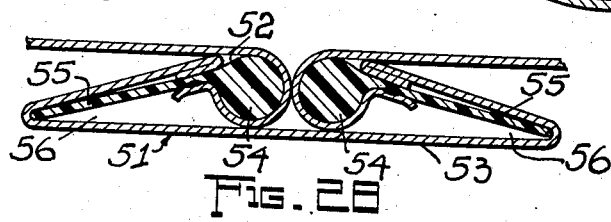
Figure 29:
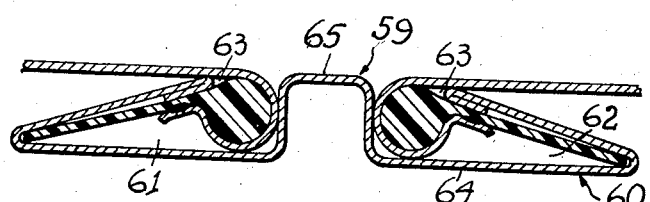

Fig. 28 is a sectional view of a two-fold fabric trim connection embodying a single female member embodying two symmetrically arranged V-shaped portions, and two aligned male members extended into the female member through a single slot midway thereof; and Fig. 29 is a sectional view of a two-fold fabric trim connection embodying a female member having two aligned triangularly shaped, laterally spaced connecting sections for individually securing male members in spaced parallel relation to the female member.

Referring more particularly to the exemplified form of the invention shown in the drawings, reference numeral 2 denotes an upholstered wire spring construction embodying a wire spring seat structure 3 mounted on a frame 4. This wire spring seat structure 3 is covered by a cover 5 tensionally stretched over wire spring seat structure 3 and attached to frame 4 by fabric trim connection 6 releasably securing the cover to the frame.

The fabric trim connection 6 embodies an elongated, resilient and pliable male member 7 and an elongated rigid female member 8 which is of tubular cross section and formed either as an integral part of frame 4 or as a separate element attached thereto. Resilient and pliable male member 7 includes a pliable core member 9 and resilient flange portions 10 tangentially extended from the core member lengthwise thereof. Resilient and pliable core member 9 is made of material such as fiber, paper, felt, plastic, or the like, to permit shaping of the core member to bends and irregularities of frame 4 and supports a preferably preformed, zigzag-shaped flat wire member 11 having its loops 12 at one side of such wire member tightly wrapped around core member 9 to secure the wire member to said core member in tangential relation with respect thereto. Wire member 11 provides male member 7 with a plurality of the resilient V-shaped, flange-like, lateral extensions 10 which permit yielding connection of male member 7 with female member 8, as will be later described.

The male member 7 is attached to edge portion 14 of cover 5 by wrapping such edge portion around core member 9 and loops 12 of zigzag-shaped flat wire member 11, and sewing end portion 15 of cover 5 to edge portion 14 by stitches 16 which are arranged adjacent core member 9 for tightly encircling the core member by edge portion 14 and freely extending V-shaped portions 10 from the core member.

Male member 7 is attached to cover 5 to provide a fabric trim connection having roll edge design or a fabric trim connection having smooth edge design. In the first case (Fig. 6), cover 5 has edge portion 14 wrapped around core member 9 to expose the right or finished side 17 of cover 5, which results in a fabric trim connection 18 (Fig. 7) having roll edge design; and in the second case (Fig. 8), cover 5 has edge portion 14 wrapped around core member 9 to expose the left or unfinished side 19 of the cover, which arrangement calls for reversed wrapping 20 of edge portion 14 around the first wrapping 21 of core member 9 to expose the right or finished surface 17 of cover 5 resulting in a fabric trim connection 22 (Fig. 9) having smooth edge design.

In the modified forms of male members disclosed in Figures 10 through 15, these male members include resilient flange portions extended radially from substantially cylindrically shaped core members. Thus, male member 23 includes a core member 24 which supports a zigzag-shaped flat wire member 25 wrapped with symmetrically twisted loops 26 tightly around core member 24 which extends through the twisted loops so that the zigzag-shaped wire member 25 is radially extended from the core member 24, in turn encircled and attached to fabric trim material 27 in the manner previously described. Core member 28 of male members 29 (Fig. 13) is built from strip material folded to cylindrical, tubular shape and mounts a zigzag-shaped flat wire member 30 which is secured to core member 28 by stitches 31 which retain the folded strip material in cylindrical, tubular shape.

The modified forms of male members shown in Figures 16 through 22 disclose integrally shaped male members 32 and 36 (Figs. 17, 18) which are extruded elements of plastic or similar material. Male member 32 embodies a substantially cylindrically shaped, elongated body 33 provided with an elongated web or flange 34 tangentially extended from body 33, which web may be radially extended from body 33 if so desired and is attached to fabric trim material 35 by gluing, heating, stitching, and the like; and male member 36 is quite similar in design to male member 32, with the exception that web 37 of male member 36 is provided with notches 38 to facilitate bending of male member 36 to fit the usual bends and irregularities in seat frames and structures.

All female members heretofore described embody elongated tubular members formed by sheet metal channels 39 of right-angled triangular cross section. These sheet metal channels 39 include side walls 40 which extend opposite right angles 41 and are shortened in width to provide the channels with elongated slots 42 permitting interengagement of male and female members, as will be later described. Side walls 40 are preferably reenforced by doubling up their exposed edge portions 43.

Figure 26:
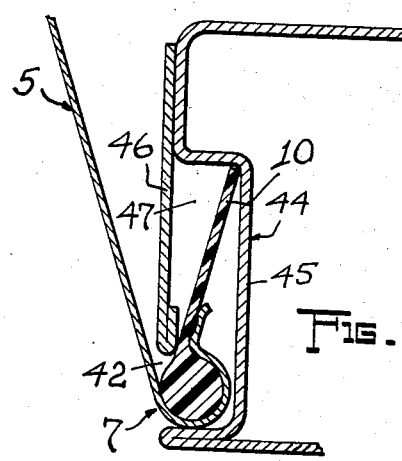
Figs. 26 through 29 show sectional views of fabric trim connections embodying modified forms of female members, thus

The modified form of female member shown in Fig. 26 discloses a structure embodying a sheet metal channel 44. This channel 44 includes a channel-shaped sheet metal base member 45 and a sheet metal cover member 46 having its one side secured to base member 45 to cover only part of channeled portion 47 to provide sheet metal channel 44 with elongated slot 42.

Figure 27:
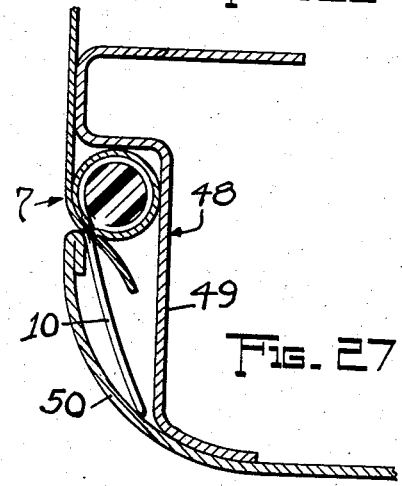

The modified form of female member shown in Fig. 27 discloses a sheet metal channel 48 of right-angled triangular cross section formed by preshaped sheet metal members 49 and 50, of which sheet metal member 50 has curvilinear outline.

The modified form of female member shown in Fig. 28 discloses a sheet metal channel 51 of equilateral triangular cross section which includes a wide slot 52 opposite base 53 of the channel midway thereof. Sheet metal channel 51 seats two male members 54 extended with their flanges or webs 55 through slot 52 into the sheet metal channel and shifted to extend their yielding webs 55 into opposed V-shaped pockets 56 of the sheet metal channel 51.

The modified form of female member shown in the fabric trim connection 59 (Fig. 29) discloses a sheet metal channel 60 having two elongated, triangularly shaped, oppositely arranged coupling chambers 61, 62 with longitudinally extended slots 63. Chambers 61, 62 are symmetrically arranged with respect to each other by forming base 64 of sheet metal channel 60 with a U-shaped rib 65 centrically thereof.

Figure 23:
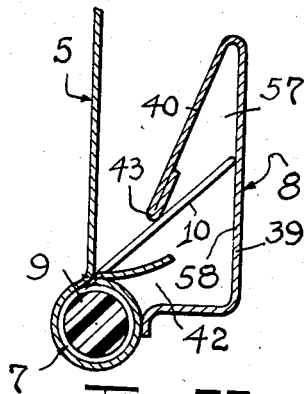
Figs. 23 through 25 show progressive steps made in assembling a fabric trim connection, thus
Figure 24:
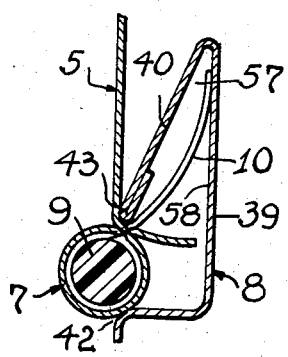
Figure 25:
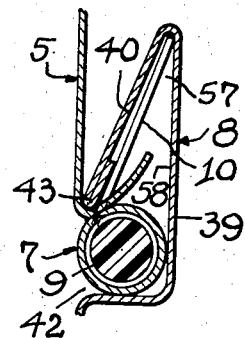

Coupling action of fabric trim connections of the type described is effected as delineated in Figs. 23 through 25, showing in Fig. 23 resilient flange 10 of male member 7 partly extended through elongated slot 42 into triangularly shaped chamber 57 of sheet metal channel 39 to contact its wall 58 and edge portion 43 of side wall 40, showing in Fig. 24 resilient flange 10 of male member 7 curved and extended into chamber 57 to permit alignment of core member 9 with slot 42, and showing in Fig. 25 core member 9 fully extended into chamber 57 and resilient flange 10 straightened out for yieldingly counteracting removal of male member 7 from chamber 57 of female member 8.

Although reference has been made throughout the specification to the resilient flange portions of the respective male members of the various typical embodiments of this invention illustrated in the drawings by various terms of reference, it will be understood that all such resilient flange elements constitute and may be generally described as "resilient webs" of the male members, and are thus defined in the claims appended hereto.

Having thus described our invention;

What we claim is:

1. In a fabric trim connection a female member formed by a longitudinally slotted tubular channel, and a flexible male member formed by an elongated, cylindrically shaped core provided with a resilient web lengthwise thereof, said female member dimensioned to encircle and seat the male member only when the resilient web thereof is extended into the female member through the slotted portion thereof and yieldingly deformed by cooperative engagement therewith to permit shifting of the male member into the female member and effect resilient retention of the male member in the female member.

2. Fabric trim connecting means as described in claim 1, wherein the core of the insert member is of generally cylindrical form and the resilient web extends tangentially therefrom.

3. Fabric trim connecting means as described in claim 1, wherein the resilient web of the insert member comprises an elongated, zigzag-shaped spring wire alternately wrapped about said core and tangentially extended therefrom successively along the length thereof.

4. A fabric trim connection as described in claim 1, wherein the tubular channel of the female member is of triangular cross section and has the slot arranged adjacent an edge of the tubular channel.

5. A fabric trim connection as described in claim 1, wherein the tubular channel of the female member is of right-angled, triangular cross section and has the slot arranged adjacent one of the acute-angled edges of such tubular channel.

6. In a fabric trim connection a rigid female member formed by a longitudinally slotted tubular channel of angular cross section, and a flexible male member formed by an elongated, cylindrically shaped core provided with a resilient web lengthwise thereof, said female member dimensioned to encircle and seat the male member only when the resilient web thereof is extended into the female member through the slotted portion thereof and yieldingly deformed to permit shifting of the male member into the female member and effect resilient retention of the male member in the female member.

7. In a fabric trim structure a supporting member, fabric trim covering the supporting member, and attaching means secured to an edge portion of the fabric trim adapted to releasably attach the fabric trim to the supporting member, said supporting member embodying a rigid, longitudinally slotted tubular channel of angular cross section, and said attaching means embodying a flexible, cylindrically shaped core provided with a resilient web lengthwise thereof, said tubular channel dimensioned to encircle and seat the flexible core only when the resilient web thereof is extended into the tubular channel through the slotted portion thereof and yieldingly deformed to permit shifting of the flexible core into the channel and effect by the resiliency of the web resilient retention of the flexible core in the tubular channel.

References Cited in the file of this patent

UNITED STATES PATENTS

| | | |
|---|---|---|
| 893,732 | Hoffman | July 21, 1908 |
| 1,724,946 | MacInerney | Aug. 20, 1929 |
| 1,926,089 | Forbes et al. | Sept. 12, 1933 |
| 2,156,164 | Pierce | Apr. 25, 1939 |
| 2,242,540 | Nordmark | May 20, 1941 |
| 2,553,043 | Hoven | May 15, 1951 |

FOREIGN PATENTS

| | | |
|---|---|---|
| 428,670 | Great Britain | May 16, 1935 |